(12) United States Patent
Arunachalam

(10) Patent No.: US 7,027,572 B2
(45) Date of Patent: Apr. 11, 2006

(54) SYSTEM AND METHOD FOR ASSOCIATING INTERACTIVE VOICE RESPONSE UNIT DATA TO A TELEPHONE CALL USING AUTOMATIC NUMBER IDENTIFIERS

(75) Inventor: Chockalingam Arunachalam, Plano, TX (US)

(73) Assignee: Aspect Software, Inc., Westford, MA (US)

( * ) Notice: Subject to any disclaimer, the term of this patent is extended or adjusted under 35 U.S.C. 154(b) by 0 days.

(21) Appl. No.: 09/943,587

(22) Filed: Aug. 30, 2001

(65) Prior Publication Data

US 2003/0043976 A1    Mar. 6, 2003

(51) Int. Cl.
*H04M 1/64* (2006.01)
(52) U.S. Cl. .............................. 379/88.2; 379/142.06; 379/142.09
(58) Field of Classification Search ............. 379/88.19, 379/88.2, 88.01, 88.02, 88.11, 88.17, 88.21, 379/265.13, 142.01, 142.09; 455/445
See application file for complete search history.

(56) References Cited

U.S. PATENT DOCUMENTS 5,309,504 A * 5/1994 Morganstein .......... 379/142.07
6,301,480 B1 * 10/2001 Kennedy et al. ............ 455/445

* cited by examiner

*Primary Examiner*—Fan Tsang
*Assistant Examiner*—Ming Chow
(74) *Attorney, Agent, or Firm*—Bourque & Assoc.

(57) ABSTRACT

A system and method of providing interactive data exchange between a plurality of outside parties utilizing a plurality of telephone apparatus, a voice response unit, at least one operator terminal, and at least one database regardless of the configuration of the voice response unit to a voice path switch. The system includes a voice response unit interface, for receiving and storing data acquired by the voice response unit. The data includes an automatic number identifier for each call. When calls are to be transferred to an operator terminal, the call is inserted into a queue that is monitored by a data controller. The data controller identifies each call by its ANI and searches the voice response unit interface to retrieve data stored therein, which is associated with the call. The data is then provided to an operator terminal for an operator assigned to handle the call.

18 Claims, 4 Drawing Sheets

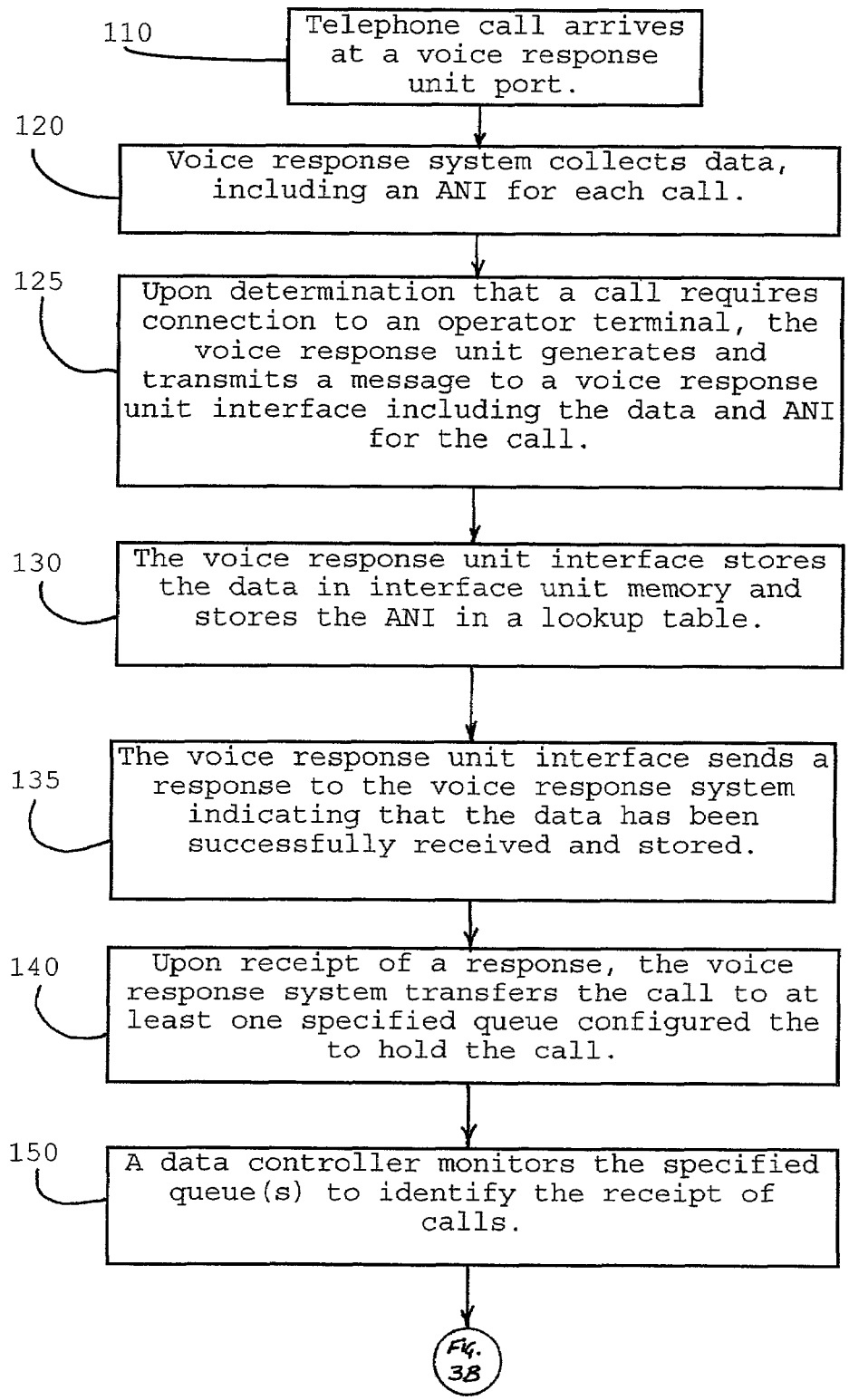

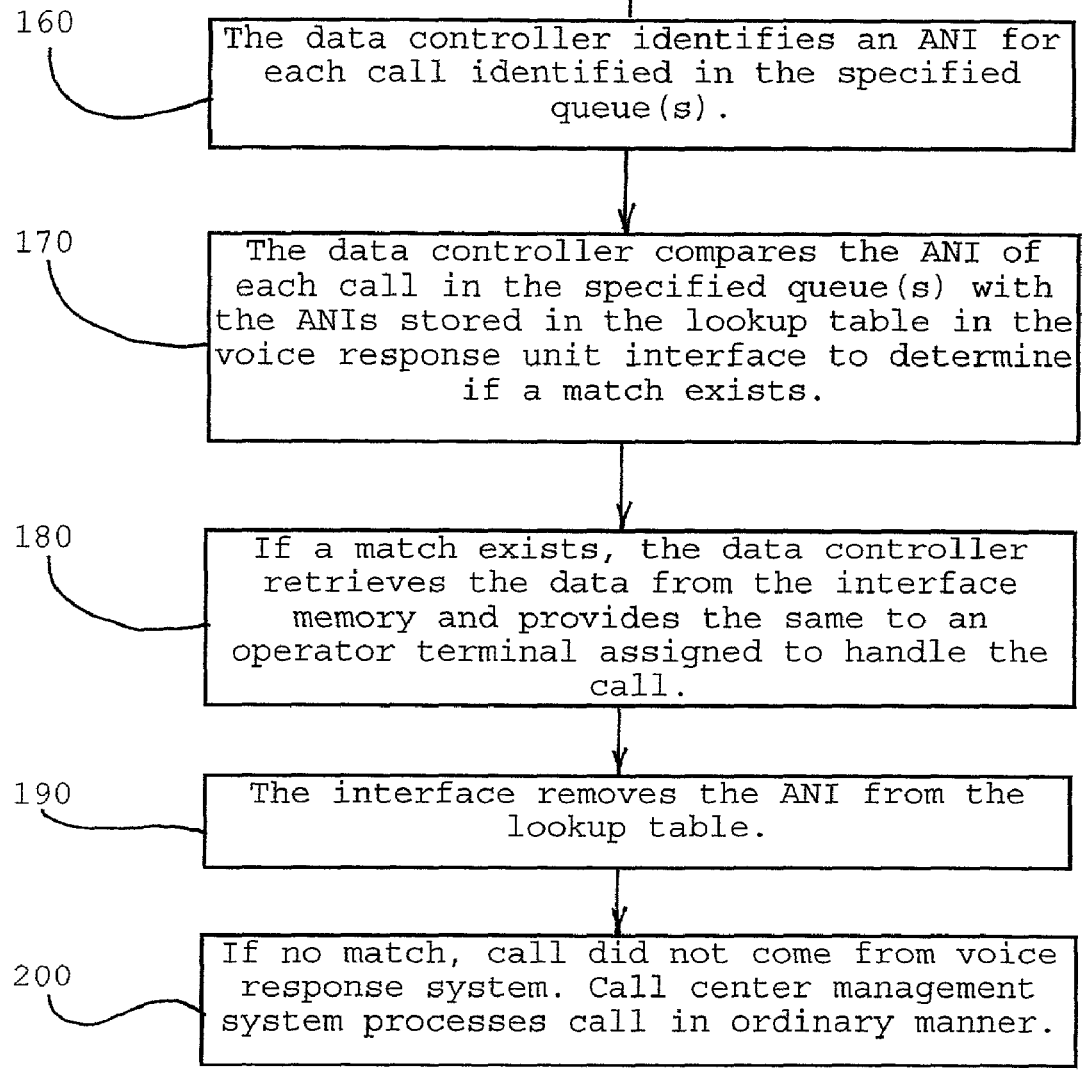

SYSTEM AND METHOD FOR ASSOCIATING INTERACTIVE VOICE RESPONSE UNIT DATA TO A TELEPHONE CALL USING AUTOMATIC NUMBER IDENTIFIERS

FIELD OF THE INVENTION

The present invention relates to computer telephony systems including computerized, interactive voice response units (IVRs) and in particular, to a system and method of associating data accumulated by an IVR with a telephone call handled by an IVR to facilitate the handling of the telephone call by a human operator.

BACKGROUND OF THE INVENTION

Service facilities, which require access to customer account data or which provide customer account data to incoming callers requesting such information typically have used operators to access and provide the requested data. In one example, a caller initiates the transaction by calling into the system, whereupon he may be placed on hold until an operator becomes available, resulting in time lost while remaining on hold. After an operator becomes available, the operator queries the incoming caller for the basic account identification information necessary to retrieve some or all of the customer file information. Again, more time is lost in the transaction with this preliminary exchange of information. Eventually, all necessary questions are posed and the desired information is available and communicated by the operator to the calling party. Having communicated the requested information, the transaction is terminated, and the operator is available for the next transaction.

Other data retrieval systems incorporate a computer voice response unit, which provides limited computer prompted queries and limited voice responses to the caller. Such a system is disclosed in U.S. Pat. No. 4,797,911. In this system, the caller responds to the prompt queries by entering a selected number sequence on the DTMF (touchtone) keypad of the caller's telephone. However, as the computer voice response unit cannot be programmed to anticipate all questions, the menu of prompting questions provided to the caller and the overall efficiency of the unit is somewhat limited. For example, if the outside party requests to be transferred to an operator for additional help or information, the operator is, at most, only apprised of the calling party's name, account number and perhaps his or her telephone number. The operator is without knowledge as to the reason for the caller's transfer as well as the status of the information exchanged thus far between the outside party and the voice response unit.

Accordingly, merely combining a computer voice response unit and an operator-based data recovery system results in some redundant operations wherein the operator must typically repeat the inquiry previously posed by the computer voice response unit and previously answered by the calling party. Therefore, the resulting system combination provides only a limited improvement in service efficiency.

Another prior art voice response system is disclosed in U.S. Pat. No. 5,164,981, which issued to the assignee of the present invention on Nov. 17, 1992 and which is incorporated herein by reference. The system provided in the '981 Patent provides rapid telephone access to customer data base information and provides efficient use of facility resources by initially connecting an outside party on a telephone apparatus to a data base through a computerized voice response unit providing digitized voice prompts, questions and other informational prompts to the outside party.

The outside party responds to the prompts by entering a selected sequence of numbers on the telephone touchtone keypad. For the majority of users, the system provides substantially all of the requested information. For information not referenced in the prerecorded computerized voice response queries or prompts or when the system detects that the outside party needs to be connected to an operator, either the outside party or the system itself may selectively transfer the call or transaction to a human operator to provide the remaining information. In addition to providing a transfer of voice signals from the computerized voice response unit to an operator, the system of the '981 Patent provides the operator with a list of information transacted thus far, as well as other information, such as calling party identity and account status. Thus, telephone database inquiries are handled with increased efficiency and speed by reducing the redundant operations by either the computerized voice response unit or the operator.

The voice response system 10 according to the '981 Patent is illustrated in FIG. 1, wherein an outside telephone apparatus 12, such as a touchtone telephone at the disposal of an outside party is connected by means of a voice telephone line 14 to voice path switch 16. Voice path switch 16 is typically a private branch exchange (PBX) or other similar apparatus adapted for scanning a number of telephone lines and upon detection of an incoming ringing signal on one of the telephone lines or the answering of a telephone in the case of an outgoing call, for providing a voice path to voice response unit 18. Although shown as a separate functional unit, voice path switch 16 may form part of voice response unit 18.

Voice response unit 18 is essentially an automated operator, taking the place of a human operator for initially establishing interactive data exchange between outside telephone apparatus 12 and at least one database 19 which may be included in the voice response unit 18 or included as part of one or more host system 22.

Upon establishing a voice link with outside telephone apparatus 12, voice response unit 18 plays a prerecorded message, prompting the user of outside telephone apparatus 12 to input selected information on the touchtone keypad or other similar mechanism associated with the outside telephone apparatus. Upon receipt of such telephone signals, voice response unit 18 converts the telephone signals to data signals. The voice response unit interprets the received telephone signals and initiates an appropriate response, such as connecting the call to an operator or requesting data from a database 19 or from host system 22.

In the case where the IVR desires to access a host system, the voice response unit 18 may access host 22 directly over signal path 25, or may assert control signals over data path 20, directing data controller 24 to establish a data signal path 28 between at least one host system 22 and the voice response unit 18. Voice response unit 18 then provides interactive data exchange between data base 19, at least one host system 22 and the outside telephone apparatus 12, converting incoming telephone signals into data signals, and providing human recognizable audio output signals in response to data signals received from the database or host system.

Upon receipt of selected telephone signals requesting transfer to an operator terminal or, based upon its own decisional criteria indicating such a transfer is required, voice response unit 18 directs voice path switch 16 to redirect voice data path 14 from connection with the voice response system to a connection with one of operator terminals 30, selected from a list of one or more available operator terminals which is kept by the voice response unit 18. Voice response unit 18 also directs data controller 24, by means of control signals over data path 20, to provide data path 21 to the selected operator terminal. In another embodiment, data controller 24 may be replaced by a multiposition mechanical switch, which is manually operated by an operator. Such a mechanical switch alternately connects an operator terminal 30 with voice response unit 18 and one or more host system 22.

Subsequently, the voice response unit 18 transfers, to the selected operator terminal 30, at least a portion of the transactional information it has stored in its transactional database 19. Such transactional information includes telephone signals received from outside telephone apparatus 12 as well as data received from host system 22. This information provides operator terminal 30 with a transactional history of what has occurred thus far during the interactive data exchange between the host system and the outside party. Accordingly, an operator at the selected operator terminal is immediately apprised of the prior history of the interactive data exchange as well as the nature of, and reason for, transfer of the call to the operator.

While this system does offer a number of advantages in terms of call center efficiency, it still suffers from at least one significant drawback. In particular, the system of the '981 Patent, like all prior known prior art voice response systems, is connected to the PBX in a manner such that all of the voice response system ports are defined as extensions on the PBX. In this manner, the data collected by the voice response system can be easily tied to a particular call.

The call center management system simply monitors the voice response system ports like it would monitor any other extension on the PBX. The call center management system is therefore notified when a call arrives on any voice response system port. The voice response system collects all the data and then transmits the data and the port to the call center management system at the appropriate time. The call center management system then ties the data with the call that is on the particular voice response system port/extension.

However, in a call center where the ports on a voice response unit are not defined as extensions on a PBX, when a call arrives at a voice response unit port, even if the voice response unit collects data and transmits the data and the port to the call center management system, the call center management system will not know about the call since it is not on a defined extension. Accordingly, what is needed is a voice response unit interface for correlating and associating data gathered by the voice response unit with a call regardless of the manner in which the voice response unit is connected to a call center management system.

SUMMARY OF THE INVENTION

The present invention provides a system and method of providing interactive data exchange between a plurality of outside parties utilizing a plurality of telephone apparatus, a voice response unit, a plurality of operator terminals, and at least one database, regardless of the configuration of the voice response unit to a voice path switch. The system includes an interactive voice response unit (IVR), responsive to telephone signals received from the plurality of outside telephone apparatus. The IVR converts at least a portion of the received telephone signals into data signals, which facilitate the interactive data exchange between each outside party utilizing an outside telephone apparatus and the database(s). The IVR provides human recognizable audio output signals to each outside party in response to data provided by the database(s) and the telephone signals received from the outside telephone apparatus. The IVR also stores a plurality of interactive data exchange records, each of which represents at least a portion of the interactive data exchange between one of the outside parties and the database(s). The system also includes a voice path switch, responsive to the IVR and to the telephone signals, for selectively connecting an outside call to at least one of the plurality of operator terminals and the voice response unit dependent upon whether operator assistance is required for the outside call.

Also included is a voice response unit interface for receiving an automatic number identifier (ANI) and an IVR port identifier for each outside call handled by the IVR along with at least a portion of the plurality of interactive data exchange records exchanged between the outside party and the IVR. The voice response unit interface includes memory for storing the received interactive data exchange records and a lookup table for storing each received ANI and IVR port identifier associated with each outside call handled by the IVR.

At least one specified queue is also included in the system for holding calls handled by the IVR while they await connection to one or more operator terminal.

Finally, the system includes a data controller, responsive to the specified queue and the voice response unit interface for identifying an ANI for each call identified in the specified queue. The data controller compares each identified ANI with the ANIs stored in the voice response unit interface lookup table. If a match exists, then the data controller retrieves the stored data and provides the same to at least one operator terminal assigned to handle said outside call.

DESCRIPTION OF THE DRAWINGS

These and other features and advantages of the present invention will be better understood by reading the following detailed description, taken together with the drawings wherein:

FIGS. 3A and 3B provide a flow chart of the operation of one embodiment of the present invention.

DETAILED DESCRIPTION OF THE PREFERRED EMBODIMENT

Figure 1:
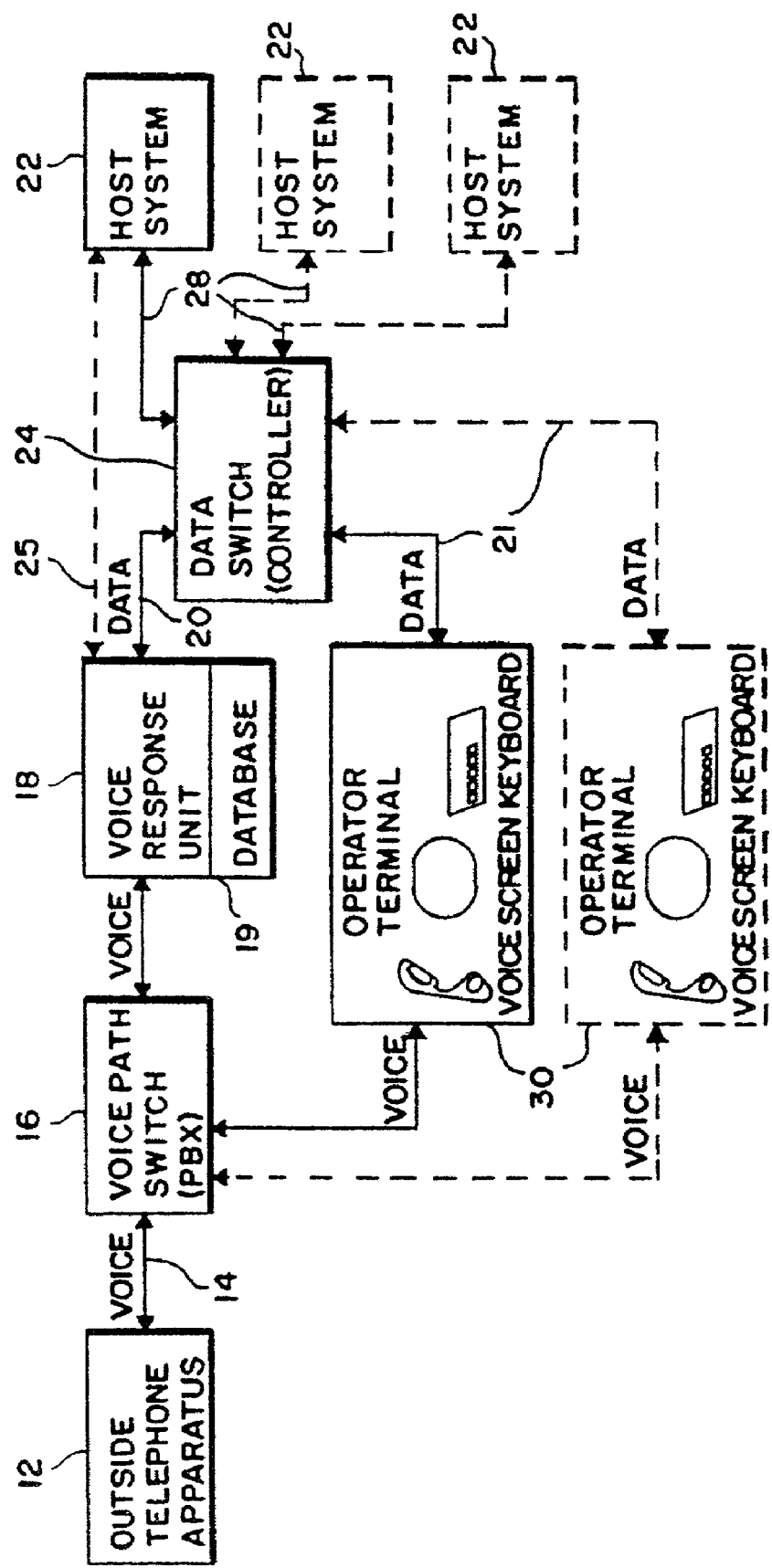
FIG. 1 is a simplified block diagram of a prior art voice response system with automated data transfer.
Figure 2:
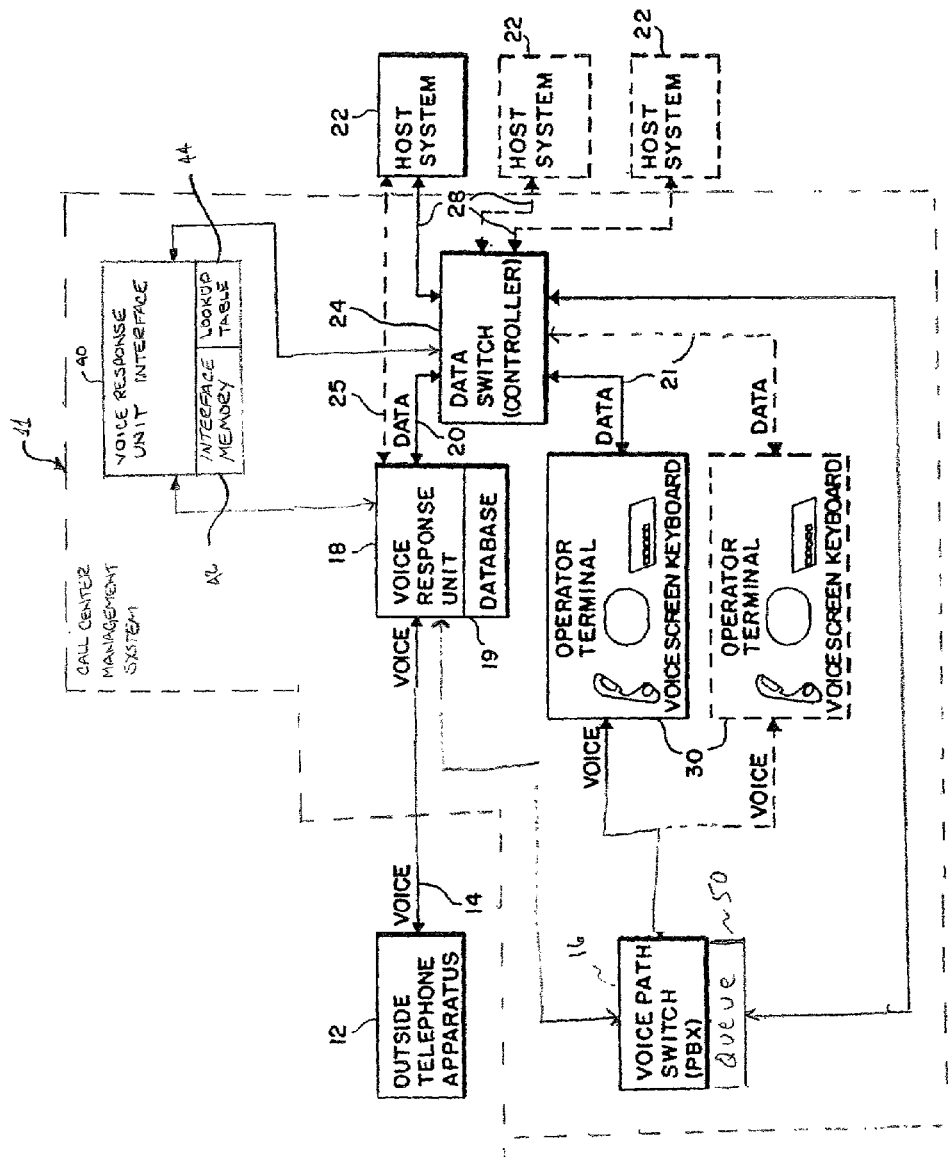
FIG. 2 is a block diagram of a voice response system interface according to the present invention.

The voice response unit interface of the present invention is shown in FIG. 2, which includes many of the same components as the prior art voice response system of FIG. 1. Like components are indicated using like reference numbers.

The voice response system 10, of the present invention, augments the prior art by providing a voice response system interface 40, which allows data exchanged during an interactive data exchange between an outside party 12 and a voice response unit 18 to be associated with the outside call regardless of the manner in which the voice response unit is connected to an incoming call.

The voice response system 10, according to the present invention, connects at least one outside telephone apparatus 12, such as a touch tone telephone at the disposal of an outside party, to a voice response unit 18 via a voice telephone line 14. Optionally, the outside telephone apparatus 12 may be connected to the voice response unit through a voice path switch (not shown), typically a private branch exchange (PBX) or other similar apparatus adapted for scanning a number of telephone lines and, upon detection of an incoming ringing signal on one of the telephone lines or the answering of a telephone in the case of an out going call, for providing a voice path to voice response unit 18. Such a voice path switch may be a separate functional unit or may be an integral portion of the voice response unit 18.

Voice response unit 18 is essentially an automated operator, taking the place of a human operator for initially establishing interactive data exchange between outside telephone apparatus 12 and at least one database 19, which may be included in the voice response unit 18 or included as a part of one or more host system 22.

Upon establishing a voice link with outside telephone apparatus 12, voice response unit 18 plays prerecorded messages, prompting the user of outside telephone apparatus 12 to input selected information on the touch tone keypad or similar mechanism associated with the outside telephone apparatus. Upon receipt of such telephone signals, voice response unit 18 converts the telephone signals to data signals. The voice response unit interprets the received telephone signals and initiates an appropriate response, such as connecting the call to an operator or requesting data from a database 19 or from host system 22.

In the case where the system desires to access a host system, the voice response unit 18 may access host 22 directly over signal path 25 or may assert control signals over data path 20, directing data controller 24 to establish a data signal path 28 between at least one host system 22 and the voice response unit 18. Voice response unit 18 then provides interactive data exchange between data base 19, at least one host system 22 and the outside telephone apparatus 12, converting incoming telephone signals into data signals, and providing human recognizable audio output signals in response to data signals received from the data base or host system.

Upon receipt of selected telephone signals requesting transfer to an operator terminal or, based upon its own decisional criteria indicating such a transfer is required, the voice response unit 18 generates and transmits a message to a voice response unit interface 40, which includes the data representing the interactive data exchange between the outside telephone apparatus 12 and the voice response unit 18 as well as an automatic number identifier (ANI) identify the outside call In the event that there is no ANI with the incoming call, the IVR preferably populates the ANI for the call with the phone number and/or extension associated with the port on which the incoming call was received. Thereafter, the data for the call will be matched to the ANI for the port on the IVR on which the call was originally received. To enable the IVR to populate the ANI for the call, the IVR preferably maintains a mapping of the port numbers to phone numbers and/or extensions. The voice response unit interface 40 stores the interactive data exchange data in interface memory 42 and stores the ANI associated with the outside call in a look up table 44. The voice response unit interface 40 then sends a response to the voice response unit 18, which indicates that the data has been successfully received and stored in interface memory 42.

Upon the receipt of such a response, the voice response unit 18 transfers the outside call to a queue 50 that is preferably a resource of voice path switch 16. In the case where the voice response unit 18 does not have native switching ability, the call would be transferred from a first voice path switch (not shown) to the voice path switch 16.

The data switch controller 24 monitors the queue 50 at all times, since it knows that the voice response unit will direct the transfer of calls requiring transfer to an operator terminal into the queue 50.

When the data switch controller 24 identifies a new call in queue 50, the data switch controller retrieves the ANI for that call. The data switch controller 24 then searches the look up table 44 in voice response unit interface 40 to determine if the ANI for the call in queue 50 matches with an ANI stored in the look up table 44. If a match exists, then the corresponding data stored in interface memory 42 is retrieved and is provided via the data switch controller to at least one operator terminal 30 over data path 21. Upon the retrieval of the data and transmission of the same to the operator terminal 30, the voice response unit interface 40 removes the entry associated with the data from the look up table 44.

If, on the other hand, the data switch controller does not identify a match in the look up table 44 for the ANI retrieved from the new call in the queue 50, then the call center management system recognizes the call as originating from some place other than the voice response unit 18. Accordingly, the call center management system would process the call as it would process any other non-voice response unit handled call.

Preferably, software for identifying the ANI associated with an incoming call resides separately on both the IVR and the data switch controller. Alternatively, such means for determining the ANI could reside in one or more other places in the system as long as the the IVR and the data switch controller are in communication with the means for identifying the ANI so that both the IVR and the data switch controller can obtain the ANI for an incoming call when necessary.

Turning now to FIGS. 3A and 3B, a method 100 of providing interactive data exchange between a plurality of outside parties utilizing a plurality of telephone apparatus, a voice response system, at least one operator terminal and at least one data base is shown. The method begins, in step 110, when a telephone call from an outside party arrives as a voice response unit port. Next, in step 120, the voice response unit establishes an interactive data exchange between the outside telephone apparatus and at least one database. In addition to collecting data via the interactive data exchange, the voice response unit also collects an automatic number identifier (ANI) from the outside telephone call.

In the event that there is no ANI with the incoming call, the IVR preferably populates the ANI for the call with the phone number and/or extension associated with the port on which the incoming call was received. Thereafter, the data for the call will be matched to the ANI for the port on the IVR on which the call was originally received.

Next, upon receipt of selected telephone signals requesting transfer to an operator terminal, or otherwise determining that interaction with an operator is required, in step 125, the voice response unit generates and transmits a message to the voice response unit interface, which collects and stores the data collected during the interactive data exchange along with the ANI of the outside call.

Upon receipt of such a message, the voice response unit interface stores the data in interface memory and the ANI in a look up table in the voice response unit interface, step 130. Next, in step 135, the voice response unit interface generates and transmits a response to the voice response unit, which indicates that the data has been successfully received and stored.

Upon receipt of a response from the voice response unit interface, the voice response unit transfers the outside call to at least one specified queue, which is configured to hold the call, step 140. A data controller included in the call center management system monitors the specified queue(s) to identify the receipt of any new outside calls therein, step 150. When a new outside call is identified in the specified queue(s), then, in step 160, the data controller identifies the ANI for the newly received call. The data controller then searches the look up table in the voice response unit interface and compares the ANI for each call in the specified queue(s) with the ANIs stored in the look up table to determine if a match exists, step 170.

If a match exists, then, in step 180, the voice response unit interface associates the data with the call and transmits the data to the operator terminal 30 designated to handle the outside call. The voice response unit interface also removes the ANI information from the look up table. If, on the other hand, no match exists, then, in step 190, the data switch controller recognizes the call as a call coming from other than the voice response unit. As such, the call center management system processes the call in an ordinary manner.

Accordingly, the disclosed system and method allows an interactive voice response unit to be compatible with a private branch exchange or other voice path switch regardless of the specific configuration of the voice response unit. Therefore, a voice response unit configured with an interface according to the present invention is compatible with any number of call center management system configurations.

Modifications and substitutions by one of ordinary skill in the art are considered to be within the scope of the present invention, which is not to be limited except by the claims which follow.

What is claimed is:

1. A system for providing interactive data exchange between a plurality of outside parties utilizing a plurality of telephone apparatus and a call center including an interactive voice response unit (IVR), at least one operator terminal, and at least one database, said system responsive to telephone signals received from said plurality of telephone apparatus, for converting at least a portion of said received telephone signals into data signals, said data signals facilitating interactive data exchange between each of said plurality of outside parties utilizing said plurality of outside telephone apparatus and said at least one database, said IVR providing human recognizable audio output signals to said plurality of outside parties in response to data provided by said at least one data base and said telephone signals received from said plurality of outside telephone apparatus, and for storing a plurality of interactive data exchange records, each of said interactive data exchange records representing at least a portion of the interactive data exchange between one of said plurality of outside parties and said at least one data base, said system comprising:

a voice path switch, responsive to said IVR and to said telephone signals, for selectively connecting said telephone signals received from said plurality of outside parties utilizing said plurality of outside telephone apparatus to at least one of said operator terminals and said IVR dependent upon whether operator assistance is required for each of said plurality of outside parties;

means for populating an automatic number identifier (ANI) including generating a populated ANI for each outside call without an associated ANI and associating said populated ANI with a telephone number or extension of a port of said IVR;

a voice response unit interface for receiving said populated and said associated ANIs for each outside call handled by said IVR along with at least a portion of said plurality of interactive data exchange records exchanged between said outside party and said IVR, said voice response unit interface including memory for storing said received interactive data exchange records and a lookup table for storing each said received ANI associated with each outside call handled by said IVR;

at least one queue, for storing at least calls handled by said IVR; and a data controller, responsive to said queue and said voice response unit interface, for identifying said populated and said associated ANIs for each call identified in said specified queue, for comparing each of said identified populated and associated ANIs with said received populated and associated ANIs stored in the voice response unit interface lookup table, for retrieving said collected data associated with said populated and said associated ANIs stored in said voice response unit interface, and for providing said retrieved data to at least one operator terminal assigned to handle said outside call.

2. The system of claim 1, wherein said voice response unit includes said at least one database.

3. The system of claim 1, wherein said voice response unit and said voice response unit interface share a common database.

4. The system of claim 1 further including at least one host system including said at least one database.

5. The system of claim 4, wherein said voice response unit receives said data from said at least one host system.

6. The system of claim 1, wherein said voice path switch includes a private branch exchange (PBX).

7. The system of claim 1, wherein said voice response unit includes said voice path switch.

8. A method of providing interactive data exchange between a plurality of outside parties utilizing a plurality of telephone apparatus, a voice response system, at least one operator terminal, and at least one database, said method comprising the steps of:

connecting an outside telephone apparatus to an interactive voice response unit (IVR) and receiving telephone signals, at said IVR, from said plurality of outside telephone apparatus and for converting at least a portion of said received telephone signals into data signals, said data signals facilitating interactive data exchange between each of said plurality of outside parties utilizing said plurality of outside telephone apparatus and said at least one database;

providing human recognizable audio output signals by said IVR to said plurality of outside parties in response to data provided by said at least one data base and said telephone signals received from said plurality of outside telephone apparatus;

storing a plurality of interactive data exchange records, each of said interactive data exchange records representing at least a portion of the interactive data exchange between one of said plurality of outside parties and said at last one data base;

selectively connecting said telephone signals received from said plurality of outside parties utilizing said plurality of outside telephone apparatus to at least one of said operator terminals and said voice response unit dependent upon whether operator assistance is required for each of said plurality of outside parties;

populating an automatic number identifier including generating a populated automatic number identifier (ANI) for each outside call without an associated ANI and associating said populated ANI with a telephone number or extension of a port that received of the IVR;

receiving the populated and associated automatic number identifier (ANI) for each outside call handled by said IVR along with at least a portion of said plurality of interactive data exchange records exchanged between said outside party and said IVR;

storing said received interactive data exchange records in a voice response unit interface memory, including a lookup table for storing each said received populated and associated ANI associated with each outside call handled by said IVR;

holding calls handled by said IVR in at least one queue until a voice path is established between a held call and at least one operator terminal;

identifying said populated or associated ANI for each call held in said specified queue and comparing each said identified said populated or associated ANI with the said populated and associated ANIs stored in the voice response unit interface lookup table; and retrieving said collected data associated with. a stored said populated or associated ANI, and for providing said retrieved data to said at least one operator terminal assigned to handle said outside call.

9. A system for providing interactive data exchange between an outside party making a telephone call and a call center, comprising:

means for populating an Automatic Number Identifier (ANI) including generating a populated ANI for an incoming telephone call without an associated ANI and associating said populated ANI with a telephone number or extension of a port;

means for identifying the populated or the associated ANI associated with an incoming telephone call;

means for selectively connecting the incoming telephone call to an interactive voice response unit (IVR) and a voice path switch;

a data switch controller;

an IVR in communication with ANI means and including means for receiving a telephone signal from an incoming telephone call;

a database capable of generating data signals, in communication with the IVR;

an IVR interface in communication with the IVR and to the data switch controller, the IVR interface comprising a memory for storing at least a portion of the data signals and a lookup table for storing the populated and associated ANIs;

an operator terminal in communication with the data switch controller;

a voice path switch in communication with the operator terminal, the IVR, the ANI means, and the data switch controller and responsive to the data switch controller for switching calls between the IVR and the operator terminal.

10. The system of claim 9, wherein the IVR includes the database.

11. The system of claim 9, wherein the IVR and the IVR interface share a common database.

12. The system of claim 9 further including at least one host system including a database.

13. The system of claim 12, wherein the IVR receives data from the host system.

14. The system of claim 9 wherein the voice path switch comprises a queue for holding the telephone call prior to transferring the call to the operator terminal.

15. The system of claim 14 wherein the data switch controller monitors the queue.

16. The system of claim 15 wherein the IVR comprises a first ANI means and the data switch controller comprises a second ANI means.

17. The system of claim 9, wherein the means for selectively connecting the incoming telephone call to an interactive voice response unit (IVR) or a voice path switch is a second voice path switch.

18. The system of claim 9, wherein IVR comprises the means for selectively connecting the incoming telephone call to an interactive voice response unit (IVR) or a voice path switch.

* * * * *